United States Patent Office 3,808,269
Patented Apr. 30, 1974

3,808,269
PROCESS FOR RECOVERING IMINODIACETIC ACID FROM SODIUM SULFATE SOLUTIONS
Robert W. Bragdon, Marblehead, Mass., and Jon C. Thunberg, Amherst, and William P. Moore, Durham, N.H., assignors to W. R. Grace & Co., New York, N.Y.
No Drawing. Filed Dec. 29, 1972, Ser. No. 319,539
Int. Cl. C07c 99/12
U.S. Cl. 260—534 E                          25 Claims

ABSTRACT OF THE DISCLOSURE

Iminodiacetic acid can be recovered from a starting aqueous solution of iminodiacetic acid and sodium sulfate having a temperature above about 33° C. and containing at least about 5% iminodiacetic acid by; (a) adjusting the pH of the starting solution to 1.5–3 to form an iminodiacetic acid precipitate and a first mother liquor; (b) separating the iminodiacetic acid precipitate from the first mother liquor; and (c) recovering the separated iminodiacetic. Sodium sulfate can be precipitated from the first mother liquor by evaporating water therefrom to form precipitated sodium sulfate and a second mother liquor rich in iminodiacetic acid which can be admixed with a second lot of the starting aqueous solution and processed therewith.

BACKGROUND OF THE INVENTION

This invention is in the field of iminodiacetic acid (IDA). More specifically this invention is directed to a process for preparing pure or substantially pure IDA.

IDA can be prepared by a route originated by Eschweiler (Ann. 1894, 278, 229–239) wherein iminodiacetonitrile (IDAN) is formed by the reaction of hexamethylenetetraamine (HMTA) and HCN in an aqueous medium. The IDAN is saponified by reaction with aqueous barium hydroxide to yield the barium salt of IDA which is converted to free IDA and barium sulfate by reaction with sulfuric acid. The IDA is separated from the by-product barium sulfate and recovered. This particular process has been unsatisfactory because of low yields, the time required to complete the preparation, the relatively low quality of the IDA produced, the toxicity of soluble barium compounds, and the inconvenience and expense of using barium hydroxide.

Improved processes for preparing IDAN are taught by U.S. Pat. No. 3,167,580 (Saunders et al., 260/465.5) and U.S. Pat. No. 3,412,137 (Stutts, 260/365.5). Saunders et al. replaced the HMTA of Eschweiler with acid stabilized aqueous formaldehyde and ammonia while Stutts used Eschweiler's reactants (HMTA and HCN) in aqueous acetic acid.

It is desirable to replace Eschweiler's barium hydroxide with sodium hydroxide because the latter is cheaper, has a lower equivalent weight, is more soluble, is easier to handle under plant conditions, and sodium ions, unlike barium ions, are not toxic. However, such substitution introduces a complication in the separation and recovery of the IDA product because, unlike Eschweiler's insoluble barium sulfate by-product, sodium sulfate (the byproduct obtained where Eschweiler's barium hydroxide is replaced with sodium hydroxide) is readily soluble, thereby to render the separation and recovery of pure or substantially pure IDA difficult.

U.S. Pat. No. 3,433,832 (Swanson et al., 260/534) teaches a method for separating certain α-amino acids from aqueous solutions containing the free amino acid and sodium chloride.

The Swanson et al. method is not applicable to amino acids such as iminodiacetic acid which have a solubility greater than 35.0 parts per 100 parts of water at 100° C. and it is not applicable to aqueous solutions which contain sodium sulfate in significant quantities with respect to the amino acid present.

SUMMARY OF THE INVENTION

In summary this invention is directed to a process for recovering iminodiacetic acid from an aqueous solution consisting essentially of water, iminodiacetic acid, and sodium sulfate, the mole ratio of iminodiacetic acid to sodium sulfate being 1:0.05–10, said solution having a temperature above about 33° C. and containing at least about 5% iminodiacetic, said process comprising adjusting the pH of said aqueous solution to 1.5–3 to precipitate iminodiacetic acid therefrom; separating the precipitated iminodiacetic acid; and recovering the separated iminodiacetic acid.

DESCRIPTION OF PREFERRED EMBODIMENTS

In preferred embodiments of the process recited in the above summary:
(1) The pH is adjusted to 2–2.4 or to 2.4–3.
(2) The mole ratio of iminodiacetic acid to sodium sulfate in the aqueous solution is 1:0.3–1.5.

In a preferred embodiment ("Embodiment A") this invention is directed to a process for recovering iminodiacetic acid from a starting solution consisting essentially of water, iminodiacetic acid and sodium sulfate, said starting solution having a temperature above about 33° C., said solution analyzing (containing) at least about 5% iminodiacetic acid, said process comprising:

(a) forming a first slurry consisting essentially of a first crop of precipitated iminodiacetic acid and a first mother liquor by adjusting the pH of the starting solution to 1.5–3;
(b) separating the first crop of precipitated iminodiacetic acid from the first mother liquor and recovering the separated iminodiacetic acid;
(c) forming a second slurry having a temperature effective for preventing the precipitation of iminodiacetic acid therefrom (e.g., at least 80° C.) and consisting essentially of precipitated sodium sulfate and a second mother liquor analyzing at least about 5% dissolved iminodiacetic by evaporating water from the first mother liquor (preferably at 80–120° C.);
(d) separating the precipitated sodium sulfate from the second mother liquor while maintaining the second slurry and the second mother liquor at a temperature effective for preventing iminodiacetic acid from precipitating therefrom (i.e., at a temperature effective for retaining the iminodiacetic acid in solution (dissolved) in the second mother liquor);
(e) forming a third slurry consisting essentially of a second crop of precipitated iminodiacetic acid and a third mother liquor by cooling the second mother liquor to 33–40° C.; and
(f) separating the second crop of precipitated iminodiacetic acid from the third mother liquor and recovering the separated iminodiacetic acid.

In especially preferred embodiments of the process of Embodiment A, supra;
(1) The starting solution analyzes 7–21% (or 9–13%) iminodiacetic acid.
(2) The mole ratio of iminodiacetic acid to sodium sulfate in the starting solution is 1:0.5–10.
(3) The pH of the starting solution is adjusted to 2–2.4 (or 2.4–2.8).
(4) The third mother liquor is combined with separated first mother liquor from a subsequent run.
(5) About 80–95% of the third mother liquor is combined with separated first mother liquor from a subsequent run.

(6) The starting solution consisting essentially of water, iminodiacetic acid, and sodium sulfate is prepared by reacting an aqueous disodium iminodiacetate solution with an amount of sulfuric acid effective to convert the disodium iminodiacetate to iminodiacetic acid.

In a preferred embodiment ("Embodiment B") this invention is directed to a process for recovering iminodiacetic acid from a starting solution consisting essentially of water, iminodiacetic acid and sodium sulfate, said starting solution having a temperature above 40° C., said starting solution analyzing (containing) at least about 4.5–6% (preferably 18–21%) iminodiacetic acid, said process comprising;

(a) forming a first slurry consisting essentially of a first crop of precipitated iminodiacetic acid and a first mother liquor by cooling said starting solution to 33–40° C. and adjusting the pH thereof to 1.5–3 (the pH adjustment can be made before or after cooling).

(b) separating the first crop of precipitated iminodiacetic acid from the first mother liquor and recovering the separated iminodiacetic acid;

(c) forming a second slurry consisting essentially of precipitated sodium sulfate and a second mother liquor consisting essentially of water with sodium sulfate, and iminodiacetic acid dissolved therein, the second mother liquor analyzsing (containing) at least about 4.5–6% dissolved iminodiacetic acid, by evaporating water from the first mother liquor (e.g., at 80–120° C.);

(d) separating the precipitated sodium sulfate from the second mother liquor while maintaining the second slurry and the second mother liquor at a temperature effective to prevent iminodiacetic acid from precipitating therefrom;

(e) forming a third slurry consisting essentially of a second crop of precipitated iminodiacetic acid and a third mother liquor by cooling the second mother liquor to about 33–40° C.; and (f) separating the second crop of precipitated iminodiacetic acid from the third mother liquor and recovering the separated iminodiacetic acid.

In especially preferred embodiments of the invention of Embodiment B, supra;

(1) The mole ratio of iminodiacetic acid to sodium sulfate in the starting solution is 1:0.5–10.

(2) The pH of the starting solution is adjusted to 2–2.4 or 2.4–2.8.

In an especially preferred embodiment of this invention as recited in Embodiment A and Embodiment B, both supra, the dissolved IDA content of the second slurry is adjusted to 8–15% or 8–13% by evaporating water from the first mother liquor (i.e., by boiling said mother liquor) before separating precipiated sodium sulfate therefrom. This boiling can be done at atmospheric pressure, or about atmospheric pressure (e.g., about 760 mm. of mercury absolute) under reduced pressure (e.g., 100–700 mm. of mercury absolute), or under elevated pressure (e.g., 1.5–3 or 4 atmospheres absolute). However, no particular advantage is gained by using reduced or elevated pressure.

In other preferred embodiments of the process of this invention as recited in Embodiment A or B, the first slurry can be formed by cooling the starting solution to 33–40° C., or 31–41° C., or 30–42° C., or 29–43° C., and adjusting the pH of the thus cooled solution to 1.5–3.1; 1.6–2.8; 2.4–2.5; 2.5–2.8; 2.6–2.7; 2.7–2.9, or 2.8–3. The cooling can be done before or after adjusting the pH or while adjusting the pH. These embodiments can also be used with Embodiment C, infra (the first solution of Embodiment C corresponding to the starting solution of Embodiments A and B, supra).

In another preferred embodiment ("Embodiment C") this invention is directed to a process for recovering iminodiacetic acid from a first solution consisting essentially of water, iminodiacetic acid, and sodium sulfate, said solution having a temperature above 33° C. and analyzing at least 5% iminodiacetic acid, said process comprising;

(a) forming a first slurry consisting essentially of precipitated iminodiacetic acid and a first mother liquor by adjusting the pH of a first portion of the first solution to 1.5–3;

(b) separating the precipitated iminodiacetic acid from the first mother liquor and recovering the separated iminodiacetic acid;

(c) forming a second slurry consisting essentially of precipitated sodium sulfate and a second mother liquor analyzing at least 5% dissolved iminodiacetic by evaporating water from the first mother liquor;

(d) separating the precipitated sodium sulfate from the second mother liquor while maintaining the second slurry and the second mother liquor at a temperature effective for preventing iminodiacetic acid from precipitating therefrom;

(e) forming a second solution by admixing at least a portion of the second mother liquor with a second portion of the first solution;

(f) forming a third slurry consisting essentially of precipitated iminodiacetic acid and a third mother liquor by adjusting the pH of the second solution to 1.5–3;

(g) separating the precipiated iminodiacetic acid from the third mother liquor and recovering the separated iminodiacetic acid;

(h) forming a fourth slurry consisting essentially of precipitated sodium sulfate and a fourth mother liquor analyzing at least 5% of dissolved iminodiacetic by evaporating water from the first mother liquor; and (i) separating the precipitated sodium sulfate from the fourth mother liquor while maintaining the fourth slurry and the separated fourth mother liquor at a temperature effective for preventing iminodiacetic acid from precipitating therefrom.

Because of our disclosure it will be readily apparent to those skilled in the art that at least a portion of the fourth mother liquor can be combined with a third lot of the first solution to form a third solution which can be processed to recover IDA therefrom (according to the general procedure used to recover IDA from the second solution) and to form a fifth mother liquor (corresponding to the third mother liquor) which can be processed (according to the general procedure used to process the third mother liquor) to form a sixth mother liquor (corresponding to the fourth mother liquor). Because of our disclose it will also be readily apparent to those skilled in the art that at least a portion of the sixth mother liquor can be admixed with a fourth portion of the first solution to form a fourth solution which can be processed as above and that this general procedure can be repeated through an indefinite number of runs or "cycles," thereby to prevent waste of IDA product.

In especially preferred embodiments of the invention of Embodiment C, supra:

(1) The starting solution consisting essentially of water, iminodiacetic acid, and sodium sulfate is prepared by reacting an aqueous disodium iminodiacetate solution with an amount of sulfuric acid effective to convert the disodium iminodiacetate to iminodiacetic acid.

(2) The pH of the first solution is adjusted to 2–2.4 or 2.4–2.8.

(3) The pH of the second solution is adjusted to 2–2.4 or 2.4–2.8.

(4) The mole ratio of iminodiacetic acid to sodium sulfate in the first solution is 1:0.3–1.5.

(5)) The iminodiacetic acid concentration of the first solution is 9–21%.

(6) About 80–95% of the second mother liquor is admixed with a second lot of the first solution to form the second solution.

DETAILED DESCRIPTION OF THE INVENTION

We prefer to prepare IDA from IDAN by the following sequence of reactions:

(1) Saponification step:

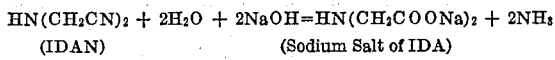

$$HN(CH_2CN)_2 + 2H_2O + 2NaOH = HN(CH_2COONa)_2 + 2NH_3$$
(IDAN)         (Sodium Salt of IDA)

(2) Acidification step:

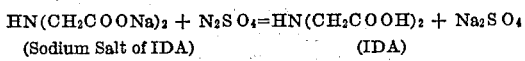

$$HN(CH_2COONa)_2 + H_2SO_4 = HN(CH_2COOH)_2 + Na_2SO_4$$
(Sodium Salt of IDA)        (IDA)

Because of our disclosure it will be readily apparent to those skilled in the art that where preparing IDA from IDANa₂ which was prepared by the hydrolysis of IDAN with aqueous NaOH solution, the above-mentioned acidification step and the pH adjusting step (e.g., the pH adjusting steps of subparagraph (a) of Embodiments A, B, or C, supra) can be combined. If desired the acidification/pH adjustment step can be preceded by or followed by a cooling step if cooling is required to precipitate IDA—but cooling should not be below about 33° C. or about 32° C., or about 30° C.

Because of our disclosure it will be readily apparent that, where; (a) crystallizing or precipitating IDA from an aqueous solution consisting essentially of water, IDA, and sodium sulfate by adjusting the pH to a pH within the range of 1.5–3; and (b) separating the crystallized IDA, the temperature of such system must be maintained at a temperature effective for precipitating (or crystallizing) and not dissolving the IDA. Where the IDA concentration is within the range of about 4.5–6% such temperature is about 33–40° C. Where the IDA concentration is greater (e.g., 8–9%, 9–13% or 10–20%, or higher) a higher temperature can be used. However, in general, the lower the temperature (down to about 33° C. or slightly lower) the higher the one pass recovery of IDA at any preselected pH within the range of about 1.5–3.

Where an excess of sodium hydroxide is added in the saponification step sufficient sulfuric acid is added in the acidification step to neutralize such excess (free) sodium hydroxide according to the following equation:

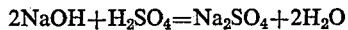

$$2NaOH + H_2SO_4 = Na_2SO_4 + 2H_2O$$

As noted supra, the pH can be adjusted during (or after the acidification step) to the level used in the separation of IDA, namely a pH within the range of pH 1.5–3 (or one of the other preferred pH ranges recited supra).

If too much sulfuric acid is added during the acidification step or where adjusting the pH, the pH can be increased by neutalizing the excess acid with sodium hydroxide or IDANa₂.

Where precipitating IDA by adjusting the pH and cooling (where cooling is required to precipitate IDA) it is generally preferred to adjust the temperature by cooling the solution consisting essentially of water, IDA and sodium sulfate to 33–40° C. and then adjusting the pH; however, excellent results have been obtained where; (a) adjusting the pH before cooling; or (b) adjusting the pH during cooling.

It is preferred that the solution from which the IDA is precipitated be substantially free of sodium chloride. However, excellent results have been obtained where precipitating IDA from solutions containing 1–2% or more sodium chloride.

Where precipitating IDA by adjusting the pH and cooling a solution (as in Embodiment B) it is generally preferred that the solution be cooled to about 33–40° C. (or 34–39° C.) but excellent results have been obtained where cooling to 31° C. or to a somewhat lower temperature (e.g., ca. 29° C.) or to 41° C. or a somewhat higher temperature (e.g., ca. 42–43° C.). In other words 33–40° C. is an important temperature range. Thus, while the precipitation (crystallization) and separation of IDA in the process of this invention has been operated (with excellent results) over a wider temperature range than 33–40° C. it is preferred to operate within said range of about 33–40° C.

The solution from which IDA is crystallized (precipitated) in the process of this invention (i.e., a solution consisting essentially of water with IDA and sodium sulfate dissolved therein such as the solution recited in the above Summary, the solution recited in step (a) of Embodiment A and Embodiment B (both supra) and the second mother liquor recited in steps (e) of said Embodiment A and said Embodiment B) should preferably contain at least about 5% IDA, but this value (5%) is not critical, and excellent results have been obtained with solutions having a somewhat lower IDA content including 4.5%, and 4.8% IDA. Economic considerations generally favor the use of concentrations somewhat or considerably greater than 5%; e.g., excellent results have been obtained with such solutions containing 8%, 10%, 12%, 15%, 20% and more IDA dissolved therein.

If the solution from which IDA is to be recovered in the process of the above summary and the embodiments depending therefrom, or the process of Embodiments A, or B, or C and the embodiments depending therefrom analyzes less than about 5% IDA (i.e., less than 5 g. of IDA per 100 g. of solution) or less than 4.5%, or less than 4%, or less than 3.5%, or less than 3% said solution can be concentrated by evaporating water therefrom either at the normal boiling point or under reduced or elevated pressure until the IDA concentration has been adjusted to the desired level. Where evaporating water from such solution care is used to avoid evaporating so much water that both IDA and sodium sulfate precipitate together. This can be readily avoided because, when sodium sulfate precipitates it can be separated from the solution by centrifuging, or filtering, or decanting while the solution is at a temperature between about 80 and 120° C. at which temperature IDA will remain in solution unles an excessive amount of water has been evaporated.

Of course, if the solution were evaporated too far and the concentration of the IDA became too high, IDA would precipitate out at an elevated temperature. However, by noting the solubility of IDA as a function of temperature, one skilled in the art can, because of this disclosure, readily avoid conditions under which IDA precipitates at elevated temperatures. For example the solubility of IDA in water is about 4 g. per 100 g. of water at 25° C. and 53 g. per 100 g. of water at 100° C.

It is generally preferred to have the IDA concentration of the starting solution from which IDA is precipitated and recovered between 5 g. and 21 g. (or between 15 and 21 g.) per 100 g. of solution, but excellent results have been obtained where using solutions containing more than 30 g. of IDA per 100 g. of solution. The IDA concentration is not critical; however, in general, the higher the IDA concentration the greater the percent IDA recovery per pass. Because of our disclosure it will be readily apparent to those skilled in the art that in the procedure of our invention as recited in the above Summary, in the embodiments thereunder, in the above Embodiment A and the embodiment thereunder, and in the above Embodiment C and the embodiments thereunder, IIDA will not precipitate on adjusting the pH of an aqueous solution consisting essentially of water, IDA, and sodium sulfate if the temperature of such solution (after adjusting its pH) is such that the concentration of the IDA dissolved in said solution does not exceed the solubility of IDA at such temperature. Because of our disclosure it will be readily apparent to those skilled in the art that, in such event, lowering the temperature of such solution to a temperature effective for precipitating IDA therefrom will cause a crop of IDA crystals to precipitate therefrom. By a temperature effective for precipitating IDA is meant a temperature sufficiently low to cause dissolved IDA to precipitate. Because of our disclosure, it will be readily apparent to those skilled in the art that the temperature can be reduced before or after adjusting the pH providing the lower temperature is maintained after the pH is lowered to avoid redissolving precipitated IDA before it is separated from the mother liquor.

It is, as noted supra, generally preferred to adjust the pH of the solution from which the IDA is to be recovered to 1.5–3 (if pH adjustment is required) after cooling it (the solution) to 33–40° C., but excellent results have been obtained where adjusting the pH where the temperature of said solution was 40° C., 45° C., 50° C., 70° C., and higher or 30° C. or somewhat lower.

To lower the pH it is preferred to add sulfuric acid, and to increase the pH it is preferred to add aqueous sodium hydroxide solution or $IDANa_2$. However, techniques for adjusting the pH are well known to those skilled in the art. The pH (or pH range) used is important but the exact technique used to reach a specific pH (or a specific pH range) is unimportant or of relatively little importance in the process of this invention. For example final adjustment of pH could be done with hydrochloric acid (to lower the pH) or with potassium hydroxide or $IDAK_2$ (to raise the pH).

Various modifications of the above recited embodiments which are fully equivalent to the process as recited in Embodiment A or the embodiments thereunder or as recited in Embodiment B or the embodiments thereunder will, because of this disclosure, be readily apparent to those skilled in the art. Such fully equivalent modifications include but are not limited to:

(1) The modification in which where making a series of batch runs using the process of this invention as set forth in; (a) Embodiment A or the embodiments thereunder; or (b) Embodiment B or the embodiments thereunder, the second mother liquor (from which the sodium sulfate has been precipitated (crystallized) and separated) is sent to and combined with the solution consisting essentially of water, IDA, and sodium sulfate (from a subsequent run) from which IDA is to be precipitated in step (a) of such subsequent run.

(2) Alternatively, second mother liquors from a plurality of runs are combined and then; (a) sent to and combined with the aforesaid solution from which IDA will be precipitated in step (a) of a subsequent run; or (b) cooled to about 33–40° C. and processed according to the procedure recited in steps (b) through (f) of said Embodiment A or B (or an embodiment thereunder).

(3) The modification in which (where making a continuous run using the general process of this invention as recited in Embodiment A or B (or an embodiment thereunder)) the second mother liquor is recycled to step (a) of said Embodiment A or B of such continuous run.

(4) Where using the process of this invention as set forth in Embodiment A (or an embodiment thereunder) or Embodiment B (or an embodiment) to make a series of batch runs the third mother liquor (from which IDA has been precipitated and separated) is sent to and combined with the first mother liquor of a subsequent run (from which IDA has been precipitated and separated) for precipitation of sodium sulfate in step (c) of Embodiment A or B (or an embodiment thereunder) of said subsequent run.

(5) Alternatively, such third mother liquor from a plurality of batch runs can be combined with such first mother liquor from which IDA has been precipitated and separated.

(6) In a continuous run the third mother liquor (from which IDA has been precipitated and separated) can be recycled to step (c) of the process recited in Embodiment A or B (or an embodiment thereunder).

Where using any of the six (6) above-recited modifications of the process of Embodiment A or B (or any of the embodiments thereunder) it is preferable to set aside (or discard) a portion (e.g., 2%, or 3%, or 4–5%, or 5–10%, or 10–20%) of the material to be sent to and combined with material in a subsequent batch run or recycled in a continuous run. This prevents the build up of undesirable side products which can (under proper circumstances) include nitrilotriacetic acid (NTA) and/or color bodies in the system. The material set aside can be processed in a separate run when sufficient material has accumulated thereby recovering substantially all of the IDA therefrom as crude (somewhat impure) IDA which can be further purified (e.g., by recrystallization from water or acidified water having a pH of 1.5–3 or 1.6–2.8, 2.3–3; 2.4–2.5; 2.5–2.8, or 2.6–2.7; or 2.7–2.9; or 2.8–3).

IDA separated by the process of this invention can, if desired be washed, for example with cool or cold water (e.g., water having the temperature of about 5–25° C. or 30° C.) or, alternatively with a solution of IDA (e.g., a saturated or nearly saturated aqueous solution of IDA).

The instant invention will be better understood by referring to the following specific but nonlimiting examples. It is understood that said invention is not limited by these examples which are offered merely as illustrations; it is also understood that modifications can be made without departing from the spirit and scope of the invention.

Example 1

A slurry consisting essentially of 4,650 lbs. of crystalline IDAN and 250 gals. (2,084 lbs.) of water was prepared by thoroughly admixing the IDAN and the water. The water had a temperature of 25° C.

A sodium hydroxide solution was prepared in a 4,000 gal. saponification reactor equipped with a turbine stirrer, heat exchange coils, and an 8 inch vapor vent connected to an ammonia scrubber by admixing therein 8,220 lbs. of a 50% sodium hydroxide (caustic soda) solution and 1,500 gals. of water.

The above-described aqueous IDAN slurry was added to the caustic soda solution by pumping the slurry into the caustic solution at an even rate over a period of 3 hours while stirring the resulting mixture. The mixture in the saponification reactor was then brought to a rolling boil and boiled at atmospheric pressure for about 1 hour vaporizing ammonia and water therefrom. The resulting solution (an aqueous solution of the sodium salt of iminodiacetic acid ($IDANa_2$)) weighed 25,170 lbs. and analyzed 33% $IDANa_2$. Said solution was cooled to 80° C. and 36 lbs. to 35% hydrogen peroxide was added to bleach the $IDANa_2$ solution (i.e., to oxidize color bodies therein). A portion of the bleached solution was evaporated to dryness and the residue was found to contain about 1% trisodium nitrilotriacetate ($NTANa_3$).

The above-described $IDANa_2$ solution was diluted with 1,779 lbs. of water and cooled to 35–40° C. 3,847 lbs. of 93% sulfuric acid was then added to the cooled $IDANa_2$ solution while passing cooling water through the heat exchange coils to prevent the temperature from rising above 50° C. While the temperature of the resulting mixture was maintained at about 50° C. 1 lb. of IDA crystals from a previous batch slurried in a liter of water was added as seed and the thus seeded material (which was designated "Slurry A") was cooled to 35–40° C. Aqueous sulfuric acid (1,649 lbs. of a 93% $H_2SO_4$ solution) was slowly added to the cooled mixture while maintaining the temperature of the resulting acidified mixture between 35 and 40° C. The pH was then adjusted to 2.1–2.3 with sulfuric acid and the resulting slurry was maintained at 33–37° C. for two hours while stirring said slurry which was designated "Slurry A." Said Slurry A was centrifuged to separate the crystals of IDA from the mother liquor which was designated "Separated Mother Liquor A." The separated crystals of IDA were washed with 16 gals. of water at about 25° C., and dried in a rotary kiln using hot air with a maximum outlet temperature 110° C. The dried IDA crystals weighed 4,450 lbs. representing a conversion (1 pass yield) of 71% based on the $IDANa_2$. The IDA crystals assayed over 99% IDA and contained 0.2% nitrilotriacetic acid (NTA), 0.1% ash, and 0.4% water.

Separated Mother Liquor A was combined with the water used to wash the IDA crystals free of said mother liquor. The resulting combination of separated mother liquor A and wash water weighed 28,033 lbs. Analyses showed that this material contained 7,964 lbs. of sodium sulfate and 1,792 lbs. of IDA; it was designated "Solution A-1."

In other runs using the general procedure of this example the procedure was modified by: (a) maintaining the temperature of the above-mentioned cooled mixture at 31° C., 32° C., 33° C., 41° C., or 42° C., while adjusting its pH and while separating the IDA product after precipitating said product; and (b) adjusting the pH to 1.5, 1.6, 1.7, 1.8, 1.9, 2.0, 2.5, 2.6, 2.7, 2.8, 2.9, 3.0, or 3.1.

In each instance excellent results were obtained.

Example 2

Solution A-1 was converted to a slurry consisting essentially of precipitated (crystallized) sodium sulfate and a mother liquor consisting essentially of water with IDA and sodium sulfate dissolved therein by boiling Solution A-1 to vaporize 12,105 pounds of water therefrom. Said slurry consisted essentially of 1,792 lbs. of IDA, 7,964 lbs. of sodium sulfate, and 6,172 lbs. of water. A substantial portion of the sodium sulfate crystallized during the boiling (concentration) step. While maintaining the temperature of the thus concentrated mixture at 90–100° C. said mixture was centrifuged to separate the crystalline sodium sulfate from the hot mother liquor. The resulting mother liquor (from which the crystalline sodium sulfate had been separated) weighed 11,062 lbs. and contained 1,792 lbs. of dissolved IDA, 2,635 lbs. of dissolved sodium sulfate, and 6,172 lbs. of water. This mother liquor was designated "Mother Liquor B-2."

In other runs the general procedure of this example the procedure was modified by using Solutions A-1 from runs made using the general procedure of Example 1 which had been modified by: (a) maintaining the temperature of the cooled mixture (of Example 1) at 31° C., 32° C., 32° C., 41° C., or 42° C. while adjusting its pH and while separating the IDA product after precipitating said product; and (b) adjusting said pH to 1.5, 1.6, 1.7, 1.8, 1.9, 2.0, 2.5, 2.6, 2.7, 2.8, 2.9, 3.0, or 3.1.

In each instance excellent results were obtained.

Example 3

Two additional replications of Examples 1 and 2 were run. In each instance the reespective results were substantially indistinguishable from those obtained in Examples 1 and 2, respectively.

Example 4

Mother Liquor B-2 from Example 2 was combined with the 2 lots of Mother Liquor B-2 from Example 3. The combined mother liquors weighed 31,797 lbs. and contained 5,376 lbs. of IDA, 7,905 of sodium sulfate, and 18,516 lbs. of water. The combined solution (combined mother liquors) was cooled to 50° C. and seeded with 1 lb. of IDA crystals suspended in a liter of water. The seeded mixture which had a pH of 2.2 was further cooled to 33-37° C. and held within said temperature range for 2 hours. A substantial quantity of IDA precipitated from the solution as a second crop (the first crop having been obtained in Example 1 and the above-mentioned replications thereof).

The precipitated IDA was separated from the mother liquor by centrifuging. The separated IDA was washed, dried as in Example 1, and weighed. Its weight was 3,595 lbs. The separated mother liquor weighed 28,202 lbs. and contained 1,781 lbs. of IDA, 7,905 lbs. of sodium sulfate, and 18,516 lbs. of water. Said mother liquor was designated "Mother Liquor C-4."

The separated IDA was indistinguishable from the first crop that was obtained in Example 1, supra.

The recovered IDA (3,595 lbs.) obtained in this example amounted to an additional recovery of 1,198 lbs. of IDA per batch (because the IDA recovered in this run (Example 4) was recovered from a combination of 3 batches). In other words, using the method recited in this example (Example 4) increased the conversion from 71% to 91%.

In other runs the general procedure of this example was modified by combining in each instance three batches of mother Liquor B-2 which had been prepared from Solutions A-1 which had been prepared by the general procedure of Example 1 which had been modified by: (a) maintaining the temperature of the cooled mixture (of Example 1) at 30° C., 31° C., 32° C., 33° C., 41° C., or 42° C., while adjusting its pH and while separating the IDA product after precipitating (crystallizing) said IDA product; and (b) adjusting said pH to 1.5, 1.6, 1.7, 1.8, 1.9, 2.0, 2.5, 2.6, 2.7, 2.8, 2.9, 3.0, or 3.1. Thus, in such runs, the second crop of IDA was precipitated (crystallized) from a mother liquor having a pH of about 1.5, 1.6, 1.7, 1.8, 1.9, 2.0, 2.5, 2.6, 2.7, 2.8, 2.9, 3.0, or 3.1 (depending upon the pH of the Solutions A-1 from which the Mother Liquors B-2 were prepared).

In each instance excellent results were obtained.

Example 5

The general procedure of Examples 1 and 2 were repeated and the results obtained were indistinguishable from those of said Examples 1 and 2.

Example 6

The general procedure of Example 1 was repeated however, in this instance the procedure was modified by adding Mother Liquor B-2 from Example 5 to the Slurry A formed in this run (Example 6) before cooling said slurry to 35–40° C. The results were indistinguishable from those of Example 1 except that the recovered IDA weighed 5640 lbs. (rather than the 4,450 pounds obtained in Example 1).

Example 7

The general procedure of Example 2 was repeated; however, in this instance the Solution A-1 which was used was that from Example 6. The results were substantially the same as those obtained in Example 2 except that the quantity of sodium sulfate precipitated was somewhat larger than in Example 2 (because of the dissolved sodium sulfate present in the Mother Liquor B-2 from Example 5 which was added to the Slurry A of Example 6).

Example 8

The general procedure of Example 1 was repeated. However, in this instance 95% of the Liquor B-2 from Example 7 was added to the Slurry A formed in this run (Example 8) before cooling said slurry to 35-40° C. The remaining 5% of the Liquor B-2 from Example 7 was discarded to prevent the accumulation of possible excessive quantities undesirable side products (e.g., NTA and color bodies) in the product IDA. The recovered IDA analyzed 99% IDA, 0.2 NTA, and 0.5% moisture.

Example 9

The general procedure of Example 7 was repeated. However, in this run the Solution A-1 which was used was that from Example 8. The results were substantially identical with those obtained in Example 7.

Example 10

The general procedure of Example 8 was repeated. However, in this instance 95% of the Liquor B-2 from Example 9 was added to the Slurry A formed in this run (Example 10) before separating the precipitated IDA therefrom at 35–40° C. The remaining 5% of the Liquor B-2 from Example 9 was discarded. The results obtained were substantially identical with those obtained in Example 8.

Example 11

A series of 8 runs was made as follows:

Run No. 1: A first solution being substantially free of NTA, weighing about 980 g., having a pH of about 3.5, and consisting essentially of water, IDA, and sodium sulfate (said solution containing about 14% IDA and having a mole ratio of IDA to sodium sulfate of 1:0.88) was boiled at atmospheric pressure to evaporate water therefrom and to form a second solution weighing 715 g. and consisting essentially of water, IDA, and sodium sulfate, the second solution contained 18.6% IDA and had a mole ratio of IDA to sodium sulfate of 1:0.88.

The second solution was cooled to 35° C. and its pH was adjusted to 2.1–2.3 by adding sulfuric acid thereto to precipitate (crystallize) IDA therefrom and to form a first slurry weighing 740 g. and consisting essentially of precipitated IDA and a first mother liquor consisting essentially of water with IDA and sodium sulfate dissolved therein. The overall (total) IDA content (dissolved IDA and precipitated IDA) of the first slurry was 18% and the mole ratio of total IDA to sodium sulfate of said slurry was 1:1.1.

The first slurry was centrifuged to separate the precipitated IDA from the first mother liquor. The separated IDA was washed with 60 g. of cool (25° C.) water applied as a fine spray, air dried, recovered, weighed, and analyzed. The recovered IDA weighed 93 g. and analyzed 100% IDA.

The first mother liquor was combined with the water used to wash the separated IDA to form a combined third solution. The third solution was boiled to evaporate 300 g. of water therefrom and to form a second slurry consisting essentially of precipitated (crystallized) sodium sulfate and a second mother liquor consisting essentially of water with IDA and sodium sulfate dissolved therein.

The second slurry was centrifuged while maintaining its temperature at 90° C. to separate the precipitated sodium sulfate from the second mother liquor. The separated second mother liquor was set aside for use in Run No. 2, infra.

Run No. 2: The general procedure of Run No. 1 supra was repeated. However, in this instance the procedure was modified by combining the separated second mother liquor from Run No. 1 with the second solution of this run (Run No. 2) before cooling said second solution to 35° C.

The air dried IDA product obtained in this run weighed 106 g. and analyzed 100% IDA.

The separated second mother liquor from this run was set aside for use in Run No. 3.

Run Nos. 3–8: The general procedure of Run No. 2 was repeated. However in each of these runs the procedure was modified by combining the separated mother liquor from the immediately preceding run with the second solution of the run underway before cooling said second solution to 35° C. as shown in Table I.

TABLE I

| Run No. | Separated mother liquor from run No. | Second solution of run No. |
| --- | --- | --- |
| 3 | 2 | 3 |
| 4 | 3 | 4 |
| 5 | 4 | 5 |
| 6 | 5 | 6 |
| 7 | 6 | 7 |
| 8 | 7 | 8 |

Table II shows the quantity and analysis of air dried IDA recovered in Runs 3–8, inclusive.

TABLE II

| Run No. | Weight of recovered IDA, g. | Purity of recovered IDA, percent |
| --- | --- | --- |
| 3 | 117 | 99 |
| 4 | 115 | 100 |
| 5 | 116 | 100 |
| 6 | 136 | 100 |
| 7 | 125 | 100 |
| 8 | 136 | 99.5 |

The second mother liquor from Run No. 8 was weighed and analyzed for IDA; it was found to contain 64.7 g. of IDA (reported as pure IDA).

Example 12

A batch of IDANa$_2$ solution (designated "Solution 12") weighing 20 kg. was prepared by the hydrolysis (saponification) of IDAN with sodium hydroxide solution. Said batch analyzed 19.1% IDANa$_2$, 1.55% trisodium nitrilotriacetate (NTANa$_3$), and 1.1% NaOH.

The following runs were made using an 880 g. portion of the above-mentioned Solution 12 in each run.

Run No. 1: An 880 g. portion of Solution 12 was boiled until about 410 g. of water had been evaporated therefrom. The temperature of the resulting hot concentrated solution was adjusted to about 52° C. and aqueous sulfuric acid (90% H$_2$SO$_4$) was added thereto to bring the pH of the resulting mixture to about 3.5 while maintaining the temperature thereof within the range of 52–60° C. Said resulting mixture was cooled to 35–40° C. and its pH was adjusted to 2.0 by adding aqueous sulfuric acid thereto while maintaining the temperature thereof at 35–40° C. The weight of the resulting slurry was adjusted to 665 g. by adding water (having a temperature of 40° C.) thereto to form a diluted slurry. Said resulting slurry was stirred for 3 hours while maintaining its temperature at 35° C. and centrifuged to separate the IDA product (the solid phase of the diluted slurry) from the mother liquor (the liquid phase of said slurry).

The separated IDA product was washed with 25 g. of water having a temperature of 20° C., air dried, recovered, weighed and analyzed for NTA (an undesirable side product).

Said recovered IDA product analyzed 6.2% NTA. Recovery of IDA was 77% of theory based on the IDANa$_2$ charged.

Run Nos. 2–11: The general procedure of Run No. 1 was repeated. However, in each of these runs the procedure was modified by adjusting the pH of the resulting mixture to the pH value shown in Table III (rather than to pH 2.0 as in Run No. 1) with aqueous sulfuric acid.

TABLE III

| Run No. | pH | NTA content of IDA product, percent | Recovery based on IDANa$_2$ charged percent |
| --- | --- | --- | --- |
| 2 | 2 | 6 | 75 |
| 3 | 2.3 | 5.5 | 77 |
| 4 | 2.4 | 1 | 75 |
| 5 | 2.5 | 0.5 | 73 |
| 6 | 2.6 | 0.3 | 70 |
| 7 | 2.7 | 0.1 | 67 |
| 8 | 2.8 | a<0.1 | 64 | a Less than 0.1%.

Three additional runs (Runs No. 9, 10, and 11) were made using the general procedure of Run No. 1. Run No. 9 was made at pH 2.9, Run No. 10 was made at pH 3.0, and Run No. 11 was made at pH 3.1. In each instance the recovered IDA contained <0.1% (less than 0.1%) NTA.

The results of the runs of this example (Example 12) show that where recovering IDA from an IDA solution containing an appreciable amount of NTA a purer IDA product (one containing a lower percentage of NTA) is obtained where the IDA is precipitated at about pH 2.5–2.8 or 2.7–2.8 or higher.

Because of its lower solubility (NTA being less soluble in water than IDA), the presence of NTA in IDA is objectionable.

Iminodiacetic acid is used in metal plating baths. German Pat. No. 1,034,946 (Chem. Abstracts 1960, 54, 16237e) describes the use of IDA in cyanide-containing copper (and copper alloy) plating baths. The presence of IDA in such baths causes copper (or the copper alloy) to plate (precipitate) as a bright coating.

The use of IDA in the preservation of rubber latex is taught by British Pat. 800,089 (Chem. Abstracts 1959, 53, 2672i).

As used herein the term "percent (%)" means parts per hundred and parts means parts by weight unless otherwise defined where used.

As used herein the term "mole" has its generally accepted meaning, a mole of a substance is that quantity which contains the same number of molecules of the substance as there are atoms in 12 grams of pure $^{12}C$.

As used herein the term "lb." means pound and the term "lbs." means pounds avoirdupois. One lb. avoirdupois is 7000 grains or 453.592 grams.

As used herein the term "g." means gram or grams.

As used herein the term "gal." gals., gallon, or gallons" means US gallon(s). One US gallon is 3.7853 liters.

"IDA" means iminodiacetic acid.
"IDAN" means iminodiacetonitrile.
"IDANa$_2$" means disodium iminodiacetate.
"NTA" means nitrilotriacetic acid.
"NTANa$_3$" means trisodium nitrilotriacetate.
"HMTA" means hexamethylenetetramine.

We claim:

1. A process for recovering iminodiacetic acid from an aqueous solution consisting essentially of water, iminodiacetic acid, and sodium sulfate, the mole ratio of iminodiacetic acid to sodium sulfate being 1:0.05–10, said solution having a temperature above 33° C. and containing at least about 5% iminodiacetic, said process comprising adjusting the pH of said aqueous solution to 1.5–3 to precipitate iminodiacetic acid therefrom; separating the precipitated iminodiacetic acid; and recovering the separated iminodiacetic acid.

2. The process of claim 1 in which the pH is adjusted to 2–2.4.

3. The process of claim 1 in which the pH is adjusted to 2.4–3.

4. The process of claim 1 in which the mole ratio of iminodiacetic acid to sodium sulfate in the aqueous solution is 1:0.3–1.5.

5. A process for recovering iminodiacetic acid from a starting solution consisting essentially of water, iminodiacetic acid and sodium sulfate, said starting solution having a temperature above 33° C., and analyzing at least about 5% iminodiacetic acid, said process comprising;

(a) forming a first slurry consisting essentially of a first crop of precipitated iminodiacetic acid and a first mother liquor by adjusting the pH of the starting solution to 1.5–3;

(b) separating the first crop of precipitated iminodiacetic acid from the first mother liquor and recovering the separated iminodiacetic acid;

(c) forming a second slurry having a temperature effective for preventing the precipitation of iminodiacetic acid therefrom and consisting essentially of precipitated sodium sulfate and a second mother liquor analyzing at least 5% dissolved iminodiacetic acid by evaporating water from the first mother liquor;

(d) separating the precipitated sodium sulfate from the second mother liquor while maintaining the second slurry and the second mother liquor at a temperature effective for preventing iminodiacetic acid from precipitating therefrom;

(e) forming a third slurry consisting essentially of a second crop of precipitated iminodiacetic acid and a third mother liquor by cooling the second mother liquor to 33–40° C.; and (f) separating the second crop of precipitated iminodiacetic acid from the third mother liquor and recovering the separated iminodiacetic acid.

6. The process of claim 5 in which the iminodiacetic acid concentration of the starting solution consisting essentially of water, iminodiacetic acid, and sodium sulfate is 7–21%.

7. The process of claim 5 in which the mole ratio of iminodiacetic acid to sodium sulfate in the solution consisting essentially of water, iminodiacetic acid, and sodium sulfate is 1:0.5–10.

8. The process of claim 5 in which the pH of the starting solution is adjusted to 2–2.4.

9. The process of claim 5 in which the pH of the starting solution is adjusted to 2.4–2.8.

10. The process of claim 5 in which the third mother liquor is combined with separated first mother liquor from a subsequent run.

11. The process of claim 5 in which 80–95% of the third mother liquor is combined with separated first mother liquor from a subsequent run.

12. The process of claim 5 in which the starting solution consisting essentially of water, iminodiacetic acid, and sodium sulfate is prepared by reacting an aqueous disodium iminodiacetate solution with an amount of sulfuric acid effective to convert the disodium iminodiacetate to iminodiacetic acid.

13. The process of claim 5 in which the second mother liquor contains 9–13% of dissolved iminodiacetic acid.

14. A process for recovering iminodiacetic acid from a starting solution consisting essentially of water, iminodiacetic acid and sodium sulfate, said starting solution having a temperature above 40° C., said starting solution analyzing at least 4.5–6% iminodiacetic acid, said process comprising;

(a) forming a first slurry consisting essentially of a first crop of precipitated iminodiacetic acid and a first mother liquor by cooling said starting solution to 33–40° C. and adjusting the pH thereof to 1.5–3.

(b) separating the first crop of precipitated iminodiacetic acid from the first mother liquor and recovering the separated iminodiacetic acid;

(c) forming a second slurry consisting essentially of precipitated sodium sulfate and a second mother liquor consisting essentially of water with sodium sulfate and iminodiacetic acid dissolved therein, the second mother liquor analyzing at least 4.5–6% dissolved iminodiacetic acid, by evaporating water from the first mother liquor;

(d) separating the precipitated sodium sulfate from the second mother liquor while maintaining the second slurry and the second mother liquor at a temperature effective to prevent iminodiacetic acid from precipitating therefrom;

(e) forming a third slurry consisting essentially of a second crop of precipitated iminodiacetic acid and a third mother liquor by cooling the second mother liquor to 33–40° C.; and (f) separating the second crop of precipitated iminodiacetic acid from the third mother liquor and recovering the separated iminodiacetic acid.

15. The process of claim 14 in which the mole ratio of iminodiacetic acid to sodium sulfate in the starting solution consisting essentially of water, iminodiacetic acid, and sodium sulfate is 1:0.5–10.

16. The process of claim 14 in which the pH is adjusted to 2.4–2.8.

17. A process for recovering iminodiacetic acid from a first solution consisting essentially of water, iminodiacetic acid, and sodium sulfate, said solution having a temperature above 33° C. and analyzing at least 5% iminodiacetic acid, said process comprising;

(a) forming a first slurry consisting essentially of precipitated iminodiacetic acid and a first mother liquor by adjusting the pH of a first portion of the first solution 1.5–3;
(b) separating the precipitated iminodiacetic acid from the first mother liquor and recovering the separated iminodiacetic acid;
(c) forming a second slurry consisting essentially of precipitated sodium sulfate and a second mother liquor analyzing at least 5% dissolved iminodiacetic by evaporating water from the first mother liquor;
(d) separating the precipitated sodium sulfate from the second mother liquor while maintaining the second slurry and the second mother liquor at a temperature effective for preventing iminodiacetic acid from precipitating therefrom;
(e) forming a second solution by admixing at least a portion of the second mother liquor with a second portion of the first solution;
(f) forming a third slurry consisting essentially of precipitated iminodiacetic acid and a third mother liquor by adjusting the pH of the second solution to 1.5–3;
(g) separating the precipitated iminodiacetic acid from the third mother liquor and recovering the separated iminodiacetic acid;
(h) forming a fourth slurry consisting essentially of precipitated sodium sulfate and a fourth mother liquor analyzing at least 5% of dissolved iminodiacetic by evaporating water from the first mother liquor; and
(i) separating the precipitated sodium sulfate from the fourth mother liquor while maintaining the fourth slurry and the separated fourth mother liquor at a temperature effective for preventing iminodiacetic acid from precipitating therefrom.

18. The process of claim 17 in which the first solution consisting essentially of water, iminodiacetic acid, and sodium sulfate is prepared by reacting an aqueous disodium iminodiacetate solution with an amount of sulfuric acid effective to convert the disodium iminodiacetate to iminodiacetic acid.

19. The process of claim 17 in which the pH of the first solution is adjusted to 2–2.4.

20. The process of claim 17 in which the pH of the first solution is adjusted to 2.4–2.8.

21. The process of claim 17 in which the pH of the second solution is adjusted to 2–2.4.

22. The process of claim 17 in which the pH of the second solution is adjusted to 2.4–2.8.

23. The process of claim 17 in which the mole ratio of iminodiacetic acid to sodium sulfate in the first solution is 1:0.3–1.5.

24. The process of claim 17 in which the iminodiacetic acid concentration of the first solution is 9–13%.

25. The process of claim 17 in which 80–95% of the second mother liquor is admixed with the second portion of the first solution to form the second solution.

References Cited

UNITED STATES PATENTS

| | | | |
|---|---|---|---|
| 2,239,617 | 4/1941 | Moore | 260—534 E |
| 2,558,923 | 7/1951 | Bersworth | 260—534 E |
| 2,816,920 | 12/1957 | Andersen | 260—534 E |

VIVIAN GARNER, Primary Examiner

U.S. Cl. X.R.

423—184